Dec. 23, 1958  A. MAZEIKA  2,865,695
AUTOMATIC SEALING MECHANISM FOR PISTONS AND THE LIKE
Filed Sept. 24, 1956
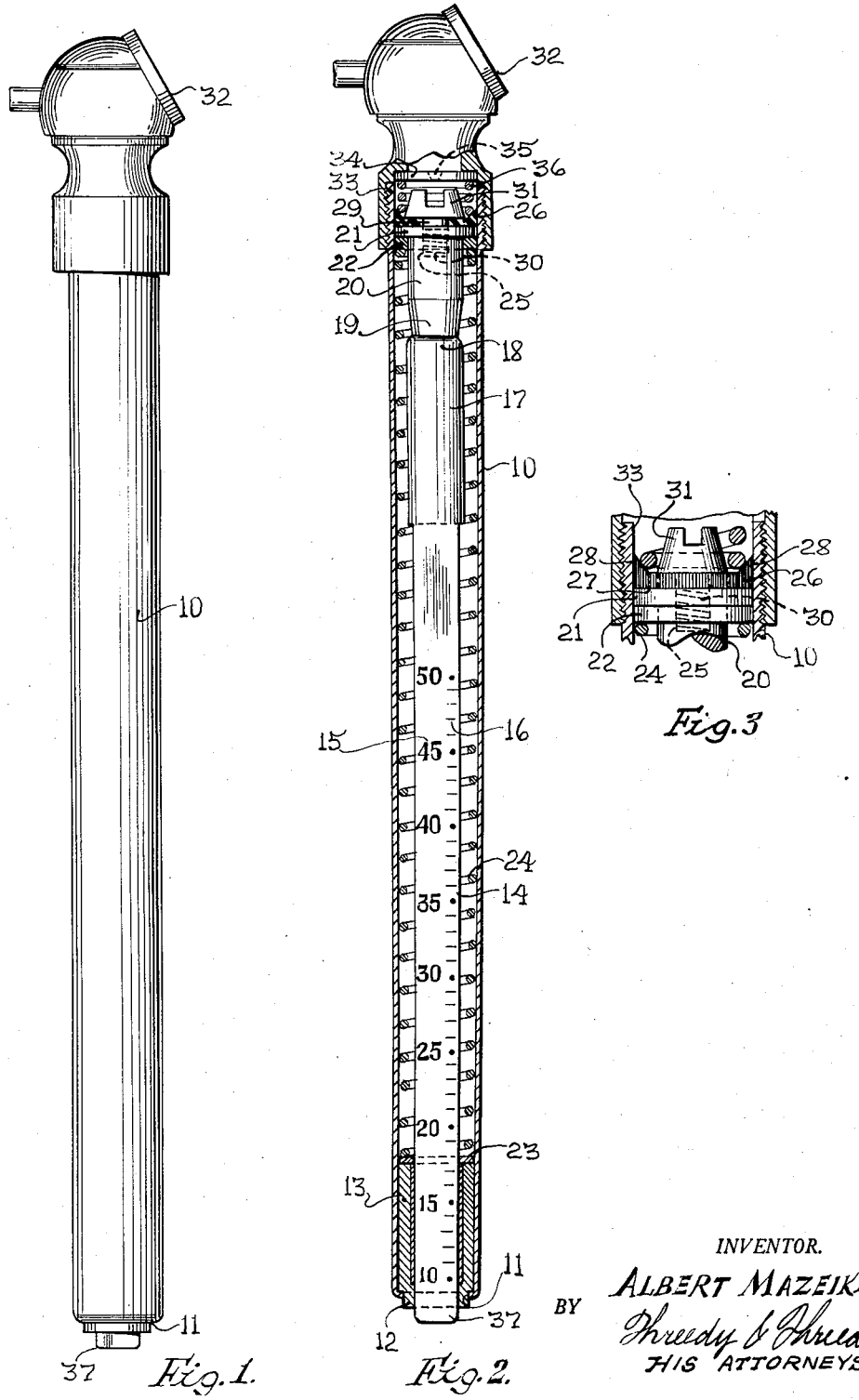
INVENTOR.
ALBERT MAZEIKA
BY
Threedy & Threedy.
HIS ATTORNEYS.

United States Patent Office 2,865,695
Patented Dec. 23, 1958

2,865,695

AUTOMATIC SEALING MECHANISM FOR PISTONS AND THE LIKE

Albert Mazeika, Chicago, Ill., assignor to Milton Manufacturing Co., Inc., Chicago, Ill., a corporation of Illinois Application September 24, 1956, Serial No. 611,618

1 Claim. (Cl. 309—34)

This invention relates to novel and useful improvements in automatic sealing mechanism for pistons and the like and has for its principal object the provision of a simplified structure effective to automatically create a seal between a piston or plunger and the walls of the cylinder within which said piston or plunger operates.

Summarily, an object of the invention is to associate with the pliable head or washer of a piston or plunger a resilient member which when placed under compression will act upon the washer or head to bear the same against the adjacent walls of the cylinder within which the piston or plunger operates, to automatically effect a positive seal between the piston or plunger and the cylinder.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of a tire or pressure gauge having incorporated therein my invention;

Fig. 2 is a longitudinal sectional detail view of the gauge;

Fig. 3 is an enlarged fragmentary sectional detail view of the upper end portion of the gauge.

While I have illustrated in the drawings my invention incorporated in a tire or pressure gauge, it is to be understood that I do not desire to limit my invention to such use. The very nature of the invention is such that the same may be utilized in connection with pistons or plungers of various types and constructions, such as pumps or the like, where it is indispensable that a perfect seal be maintained between the piston or plunger and the cylinder within which it operates.

With this in mind and referring more particularly to the drawings in which I have shown the preferred form of construction of my invention, the conventional tire or pressure gauge comprises a tube 10 having a restricted end portion 11 through which projects a reduced portion 12 of a sleeve 13. Slidably arranged in the tube 10 for projection in the sleeve 13 is a gauge or scale bar 14 having imprinted thereon indicia 15 and graduation marks 16. The upper end portion of the gauge bar 14 in the conventional tire or pressure gauge has an enlarged portion as indicated at 17, the end 18 of which abuts the stud portion 19 of a piston or plunger 20.

The plunger 20 includes a circular flange 21 which has moving engagement within the tube 10. Beneath this flange 21 is a washer 22. On the interior end portion of the sleeve 13 is a similar washer 23. Within the tube 10 and disposed between these washers is a compression spring 24. The stud portion 19 of the plunger 20 has a tapped opening 25 formed therein. Mounted on the circular flange 21 is a flexible sealing washer 26 formed substantially cup-shaped and having inside wall portions tapered upwardly and outwardly and with the bottom 27 thereof seated upon the washer 22. This washer 26 may be formed of leather or other pliable material. The side walls or flanges 28 of the washer 26 have sealing contact with the adjacent walls of the tube 10. Projected through a central opening 29 formed in the washer 26 is a thread-bearing stud 30 having an enlarged head 31 which completes a connection between the washer 26 and the stud portion 19 of the plunger 20. A gauge head 32 is threaded upon the end portion 33 of the tube 10 and has arranged therein a circular disc 34 having an air port 35 formed centrally therein. This gauge head 32 is of the conventional structure used in connection with tire or pressure gauges and operates to admit the air from the valve of a tire or the like into the tube 10. Arranged between the disc 34 and the washer 26 is an expansion spring 36, the lower end of which projects into the cup of the washer 26 to engage the tapered side walls 28 thereof, whereby to yieldably press the side walls 28 against the adjacent walls of the tube 10, thereby to automatically produce an effective seal between the plunger or piston 20 and the walls of the tube 10.

It is desirable, although not necessary, that the relationship of the several parts of the gauge as shown in the drawings, be such that under normal conditions when the bar 14 is in its innermost position within the tube 10 shown in Fig. 2, the end 37 of the bar 14 will project a short distance outwardly from the tube 10 so that the user of the gauge may, by pressing his finger or thumb against the end portion 37 of the bar 14, urge the bar inwardly of the tube 10, with the result that the spring 36 will be placed under compression to automatically bear the walls 28 of the washer 26 against the adjacent walls of the tube 10 to produce the aforesaid effective seal.

The prior art teaches that there have been employed several types of means for resetting the cup-shaped washer into sealing position within and with respect to the tube. Such arrangements have proven unsatisfactory because it has been found that due to excessive movement of the plunger or piston, the washer becomes set in its form, with the result that such prior art means no longer become effective to accomplish a perfect seal between the plunger or piston and the tube.

By my construction, the spring 36 produces the seal between the washer 26 and the inner walls of the tube 10 whenever the same is placed under compression, with the result that the washer 26, regardless of its form, will always maintain an effective seal with respect to the tube 10. This results from the fact that the washer 26 with the spring 36 acting thereon, cannot become set in form.

When air is admitted into the tube 10 through the head 32, the plunger 20 will be projected longitudinally within the tube 10 against the measuring rod 14 to project the rod 14 a distance outwardly commensurate with the air pressure admitted into the tube 10. After the pressure reading operation and upon return of the plunger to its normal position as shown in Fig. 2, the spring 36 becomes effective to automatically, yieldably urge the walls 28 of the washer 26 into sealing contact with the adjacent walls of the tube 10.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A seal for an expellable plunger of an air gauge, said plunger at one end thereof providing a circular flange, a cup-shaped washer mounted on the opposite side of said flange of said plunger, a member threadably connected to said plunger so as to connect said washer in facial abutment with the flange of said plunger, said washer having an upwardly and outwardly tapered peripheral edge portion engageable with the side wall of said cylinder and providing a spring seat, a compression spring having an end portion encircling said member and seated in the spring seat provided by said cup-shaped washer and engageable with said tapered peripheral edge thereof to urge said peripheral edge into sealing contact with the inner walls of the air gauge.

References Cited in the file of this patent
UNITED STATES PATENTS

| | | |
|---|---|---|
| 2,000,187 | Oliver | May 7, 1935 |
| 2,250,011 | Dayton | July 22, 1941 |
| 2,530,005 | Druge | Nov. 14, 1950 |
| 2,612,420 | Reynolds | Sept. 30, 1952 |

FOREIGN PATENTS

| | | |
|---|---|---|
| 638,839 | France | June 4, 1928 |